United States Patent [19]

Sato et al.

[11] 4,263,580

[45] Apr. 21, 1981

[54] MONITOR SYSTEM FOR OPERATION OF SOLENOID OPERATED DEVICES

[75] Inventors: Takao Sato, Ibaraki; Setsuo Arita, Hitachi, both of Japan

[73] Assignee: Hitachi, Ltd., Tokyo, Japan

[21] Appl. No.: 826,839

[22] Filed: Aug. 22, 1977

[30] Foreign Application Priority Data

Aug. 23, 1976 [JP] Japan ..................... 51/99666

[51] Int. Cl.[3] ..................... H04Q 5/00; G05B 11/00; H04L 11/15

[52] U.S. Cl. ..................... 340/163; 340/644; 364/104

[58] Field of Search .................. 364/104, 119; 307/41, 307/141, 141.4; 251/131; 235/302, 302.1; 340/146.1 C, 644, 163

[56] References Cited

U.S. PATENT DOCUMENTS

| | | | |
|---|---|---|---|
| 3,796,995 | 3/1974 | Strojny | 340/163 |
| 3,829,842 | 8/1974 | Langdon et al. | 364/104 |
| 3,832,688 | 8/1974 | Strojny et al. | 340/163 |
| 3,835,466 | 9/1974 | Bieszczad et al. | 340/644 |
| 3,854,122 | 12/1974 | Cross | 340/163 |
| 3,946,380 | 3/1976 | Ohnishi et al. | 340/163 |
| 4,078,196 | 3/1978 | Thadani | 340/163 |

OTHER PUBLICATIONS

"Multiplexed Rod Drive Control System for a General Electric BWR", Reigel et al., Conference Paper C73203-7, Dec. 1972.

*Primary Examiner*—Thomas A. Robinson

*Attorney, Agent, or Firm*—Craig and Antonelli

[57] ABSTRACT

Command words with address signals are transmitted periodically from a control room to field solenoid valves which are each provided with a single actuation circuit. The solenoid valves that are to be actuated in the field each correspond to the address of the transmitted command words which energize the coil of the corresponding solenoid valve. The actuation circuit inserts an address signal for that particular circuit with regard to current information flowing in the energized coil and sends it back to the control room as an acknowledge word. The control room previously predicts acknowledge words which will be sent back by the actuation circuits when the actuation circuits properly respond to the transmitted command words and the control room registers the predicted acknowledge words as reference words. The acknowledge word sent back by the actuation circuit is compared with the reference word and if an inconsistency exists a fault in the actuation circuit is indicated. The command words includes a control signal N to continuously energize the solenoid valve and a test signal for momentarily energizing the solenoid valve for test. These signals are transmitted from the control room alternately at predetermined intervals and the indication of the compared result of the acknowledge word and the reference word is inhibited during a predetermined time period after the alternation of the address.

4 Claims, 13 Drawing Figures

MONITOR SYSTEM FOR OPERATION OF SOLENOID OPERATED DEVICES

BACKGROUND OF THE INVENTION

The present invention relates to an operation monitor system capable of verifying the operation of solenoid operated devices such as solenoid valves and solenoid relays to which operation commands have been issued and continuously monitoring the operation of the solenoid operated devices when such solenoid operated devices are controlled, and more particularly to an operation monitor system which is suitable for use in combination with a remote control system for the solenoid operated devices.

In various plants, different valve means and relay means are used for various control purposes. The present invention is concerned with the solenoid operated devices of those means. The solenoid operated devices include the solenoid relays or solenoid valves, more particularly relays or valves which can assume binary states, that is, open state and close state and can switch the state by the action of electromagnet force. In the solenoid valve, a valve is normally at full open position or full close position by the action of spring force. When an exciting input is applied to an exciting coil, an electromagnet force is produced, which overcomes the spring force to move the valve to the full open position if it has been at the full close position, or to the full close position if it has been at the full open position.

In recently constructed plants, those solenoid operated devices are sometimes remotely controlled. In such cases, a central control room is located at a station remote from the installation room of the solenoid operated devices to centrally control the plurality of solenoid operated devices. In many cases, the distance from the installation room to the central control room is in the order of several hundreds meters. Accordingly, the remote control system employing a so-called data way system in which digital coded signals are transmitted and received to control the solenoid operated devices is used. This control system is suitable for use in a plant having an extensive plant area or a plant including a site located in an area which must be sealed.

One example of a plant which actually employs such a control system is a hydraulic control unit for control rods for adjusting the output of a boiling water type nuclear reactor electric power generating plant. The hydraulic control unit includes several solenoid valves per control rod, and the direction of the movement of the control rod is determined by opening or closing a particular one of the solenoid valves so that the power of the nuclear reactor is increased or decreased. By way of example, in a nuclear reactor electric power generating plant of the 1100 MWh class, the number of the control rods amounts to 200 and the number of solenoid valves amounts to 800. As the control rods are inserted into the nuclear reactor, the power of the nuclear reactor decreases and as the control rods are withdrawn the power of the nuclear reactor increases.

The following article introduces and outlines the control system of the hydraulic control unit of a nuclear reactor plant: "Multiplexed Rod Drive Control System for a General Electric BWR" by D. W. Reigel, E. E. Goodale and S. E. Moore, Conference Paper C 73 203-7, a paper recommended by the IEEE Power Generation Comittee of the IEEE Power Engineering Society for presentation at the IEEE PES Winter Meeting, New York, N.Y. Jan. 28–Feb. 2, 1973; manuscript submitted Sept. 14, 1972, made available for printing Dec. 11, 1972.

According to the above paper, in the remote control system employing a data way system, unique address codes are assigned to respective ones of the plurality of solenoid valves in the installation room. The central control room converts the address codes of the solenoid valves to be operated and the contents of the operations into digital coded signals and applies them as command words to the data way between the installation room and the central control room. The digital coded signals transmitted to the field over the data way are applied to actuation circuits provided one for each of the solenoid valves. Each of the actuation circuits decodes the address code of the transmitted digital coded signal, and when it coincides with the address assigned to its own solenoid valve, it controls the open/closed operation of its own solenoid valve in accordance with the content of operation transmitted. In the installation room, the operation status of the solenoid valve to which the command word was applied is converted into an acknowledge word, which is then sent back to the control room. The control room compares the acknowledge signal with the corresponding command word to check whether the solenoid valve has been operated properly. The command words include two signals, one being a control signal N used to actually drive the control rod and the other being a test signals S used to test the solenoid valve. In the following description, when it is not necessary to distinguish the signal N from the signal S, they are referred to as the command word. The command word consists of a synchronizing signal part, an address signal part to specify the solenoid valve or control rod, and an operation signal part to indicate the content of the operation. The acknowledge word which is derived encoding the operation status of the solenoid valve and sent back to the central control room is assembled each time the command word is applied, and transmitted. Accordingly, the acknowledge word is transmitted whether the command word is the signal N or the signal S. The format of the acknowledge word is basically similar to that of the command word with the exception that the operation signal part is replaced by an acknowledge signal section.

This system senses a voltage across the coil of the solenoid valve and edits the sensed information into the acknowledge word, which is then compared for verification. However, there is a problem here because the exciting power for the coil is an A.C. power. Namely, when a switch for exciting the coil is closed in response to the command word, the voltage across the coil is substantially zero, but since the voltage of the A.C. supply may be near zero potential it is not possible to discriminate whether zero potential occurs due to the closure of the switch or due to the zero potential of the A.C. supply voltage, by merely sensing the zero voltage across the coil. Thus, if the switch was not closed when the command word was applied but it happened that the A.C. supply voltage was small at that moment, the actuation circuit would be determined to be normal. Furthermore, it cannot always be determined that the solenoid valve has been operated from the fact that the switch has been closed because the valve might have been stuck in one position even though the coil has been excited.

SUMMARY OF THE INVENTION

In the light of the above, it is an object of the present invention to provide a reliable operation monitor system for solenoid operated devices.

It is a specific object to provide an operation monitor system for solenoid operated devices, which is capable of identifying that the valves have been actually and correctly operated to improve the reliability of the test.

According to the present invention, currents flowing in the solenoid operated devices are monitored in order to test the solenoid operated devices which are opened or closed by energizing the coil thereof by the A.C. power supply and to identify the exciting operation. If the magnitude of the current during the continuous excitation is at a predetermined level, the normal operation of the solenoid operated device is identified and if a pulse current flows through a bypass circuit of the coil the test is identified.

DESCRIPTION OF THE PREFERRED EMBODIMENTS

The operation monitor system of the present invention is now explained in conjunction with a hydraulic control unit for control rods for adjusting the power output of a boiling water type nuclear reactor electric power generating plant.

Figure 1:
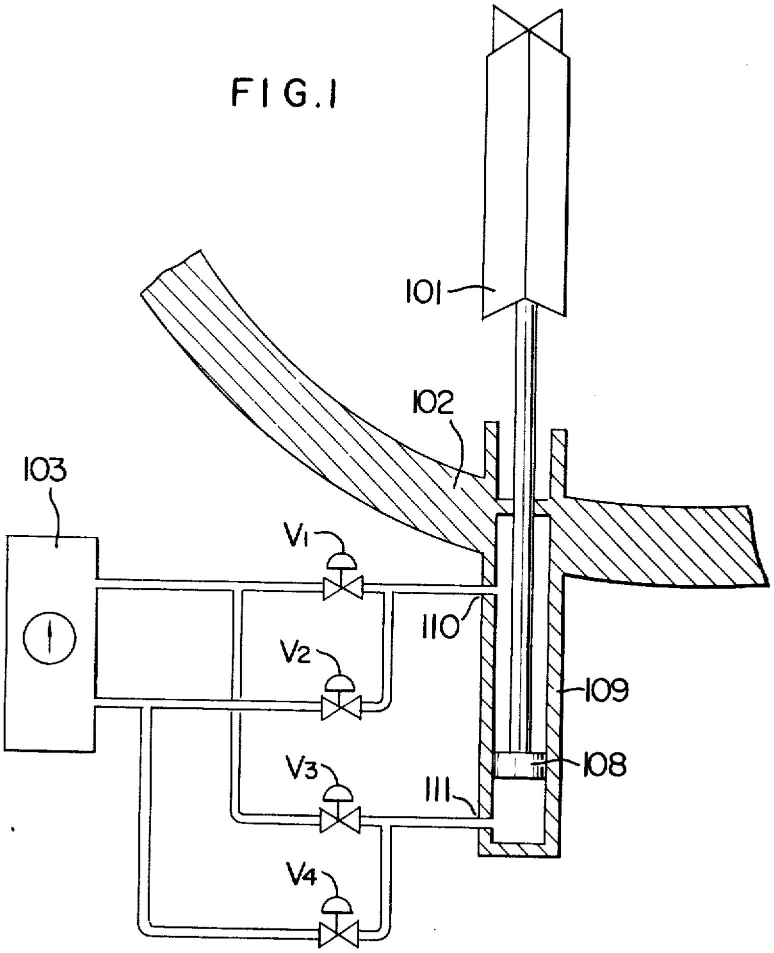
FIG. 1 schematically shows a construction of a hydraulic control unit for control rods of a boiling water type nuclear reactor electric power generating plant to which the present invention is applied.

In FIG. 1, numeral 102 denotes a wall of a reactor pressure vessel in which water is contained. A plurality of fuel assemblies, not shown, and a plurality of control rods 101 for adjusting the power output are immersed in the water. Only one control rod 101 is shown in FIG. 1. The control rod 101 is linked to a piston 108 in a cylinder 109. Water is supplied to the cylinder 109 through cylinder ports 110 and 111, and the piston 108 and hence the control rod 101 are moved up and down by the water pressure. Numeral 103 denotes a pump for applying the water pressure and $V_1$, $V_2$, $V_3$ and $V_4$ denote solenoid valves which are controlled and monitored by the system of the present invention. The solenoid valves $V_1$ to $V_4$ are opened or closed depending on to which of the cylinder ports 110 and 111 the water flow is to be applied and to which of upward and downward directions the control rod 101 is to be moved. Namely, when the control rod 101 is not to be moved, the valves $V_1$ to $V_4$ are all fully closed, and when the control rod 101 is to be moved either a combination of $V_1$ and $V_4$ or a combination of $V_3$ and $V_2$ is opened. For example, when it is desired to drive the control rod 101 into the nuclear reactor, $V_3$ and $V_2$ are opened. Then, the water flow is applied from the pump 103 through the valve $V_3$ to the cylinder port 111. The water within the cylinder 109 is returned to the pump 103 from the cylinder port 110 through the valve $V_2$. As a result, the piston 108 is pushed upward so that the control rod 101 is driven in. When it is desired to drive the control rod 101 out of the nuclear reactor, the valves $V_1$ and $V_4$ are opened. Thus, the water flow is applied from the pump 103 through the valve $V_1$ to the cylinder port 110. The water within the cylinder is returned to the pump 103 from the cylinder port 111 through the valve $V_4$. As a result, the piston 108 is pushed downward so that the control rod 101 is driven out. As the control rod is driven in the power of the nuclear reactor decreases, and as the control rod is driven out, the power of the nuclear reactor increases.

Figure 2:
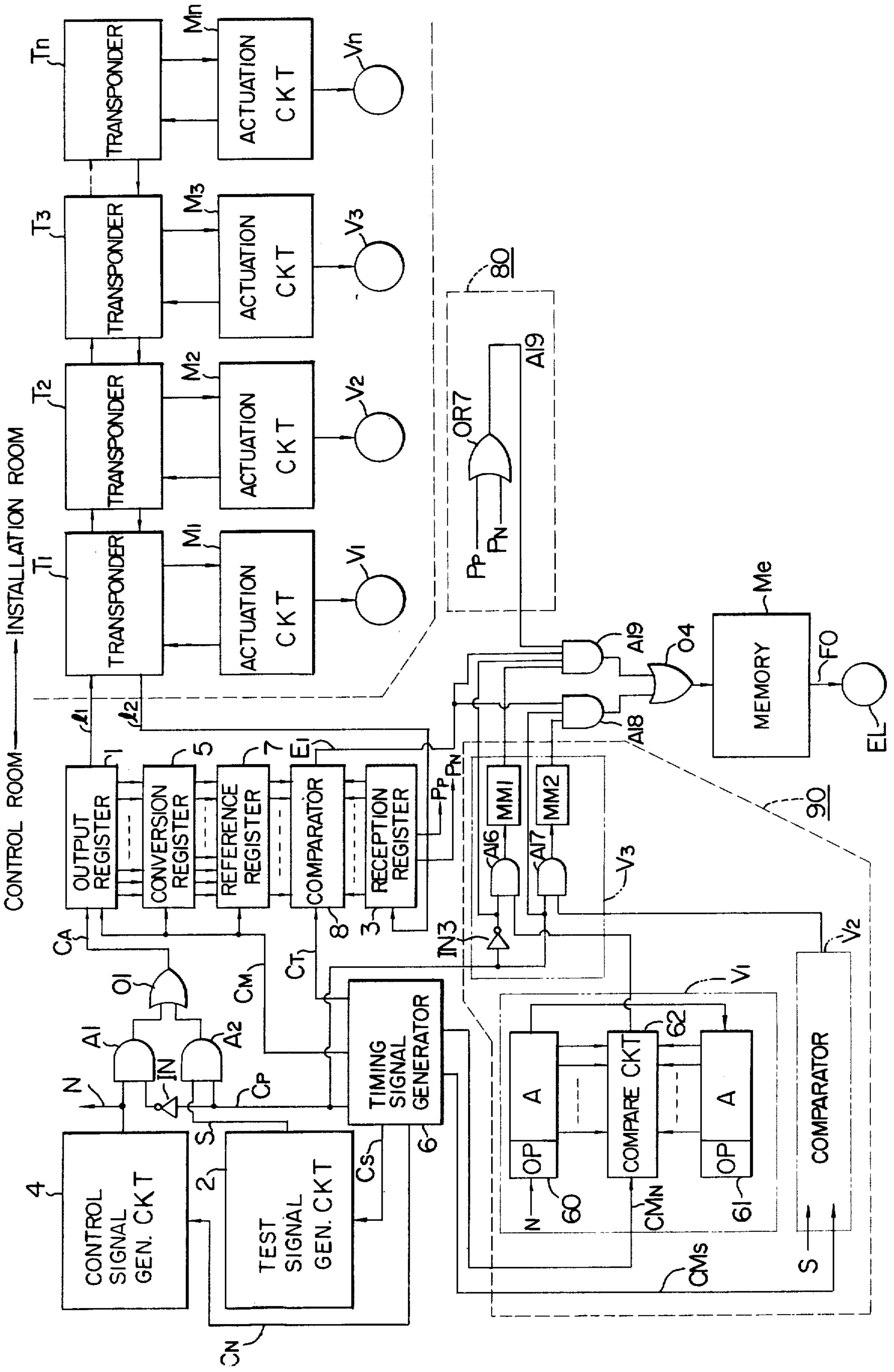
FIG. 2 schematically shows a construction of a remote control system including an operation monitor system of the present invention.

FIG. 2 shows a system for remotely controlling the solenoid valves $V_1$ to $V_4$ of FIG. 1. In FIG. 2, the section on the right side of a broken line shows apparatus installed around the reactor pressure vessel in the installation room and the section in the left indicates apparatus installed in the central control room. In this system, the command words are applied to a data way $l_1$ and the acknowledge words are applied to a data way $l_2$. The command words are all transmitted from an output register 1, to which two input signals are applied, one being a control signal N which is supplied by a control signal generating circuit 4 via an AND circuit A1 and an OR circuit O1 and the other being a test signal S which is supplied by a test signal generating circuit 2 via an AND circuit A2 and OR circuit O1. Numeral 6 designates a timing signal generating circuit to be described later in detail, which controls the timing for assembling the command word from the signals N and S and the timing for judging an abnormal state of the solenoid valve by the acknowledge words.

The difference between the signals N and S is explained with reference to FIGS. 10A to 10C. Both signals each consists of a synchronizing signal part Y, an address signal part A for specifying a valve to be operated and an operation signal part OP. The synchronizing signal part Y has no characteristic feature and hence it is not explained here.

Figure 10A:
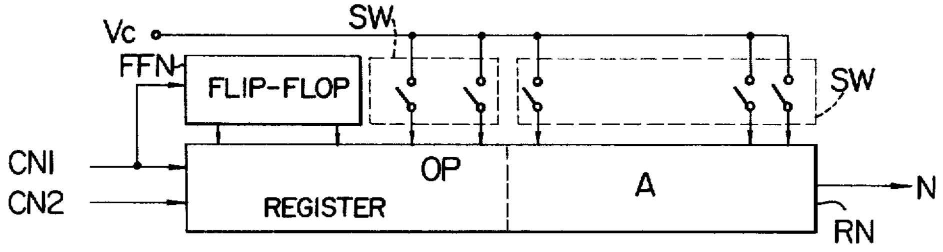
FIGS. 10A to 10C illustrate the formation of the control signal N and the test signal S.

FIG. 10A shows an apparatus for the signal N. The address A is determined by an operator in the control room depressing a selection switch Sw. The address is not altered unless the operator releases the selected switch. The operation signal part OP of the signal N includes an area which is to be set by the operator's closing the switch Sw and an area which is set each time the signal is transmitted. In the present invention, only the latter area is important and hence described below.

That area is set by a flip-flop FFN. A register RN is controlled by pulse inputs CN1 and CN2. The pulse input CN1 serves to register the inputs from the switch Sw and the flip-flop FFN into the register RN and drive the flip-flop FFN. When the flip-flop FFN is of 2-bit type, it is switched between "10" and "01" each time the pulse CN1 appears. The pulse CN2 is send pulses which consist of as many pulses as the number of bits of the register RN whereby the data set in the register RN by the pulse CN1 are applied to the output register 1.

Figure 10B:
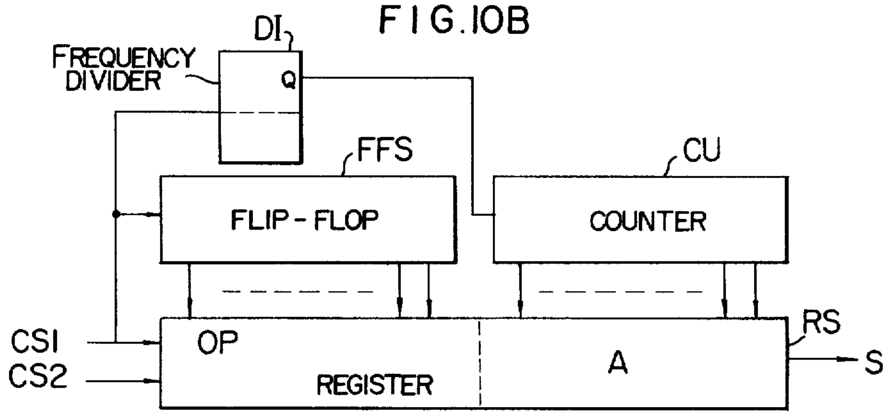

FIG. 10B shows an apparatus for the test signal S, in which CS1 and CS2 correspond to CN1 and CN2, repectively. FFS designates the same flip-flop as the FFN and it is switched, for example, between "10101" and "01010" each time the pulse CS1 appears. DI denotes a frequency divider and CU denotes a counter. Each time two pulses CS1 arrive, "1" appears at a terminal Q of the frequency divider DI and the content of the counter CU changes. That is, the address is changed each time two CS1 pulses arrive. The CS2 pulse is a send pulse produced in this manner.

Figure 9:
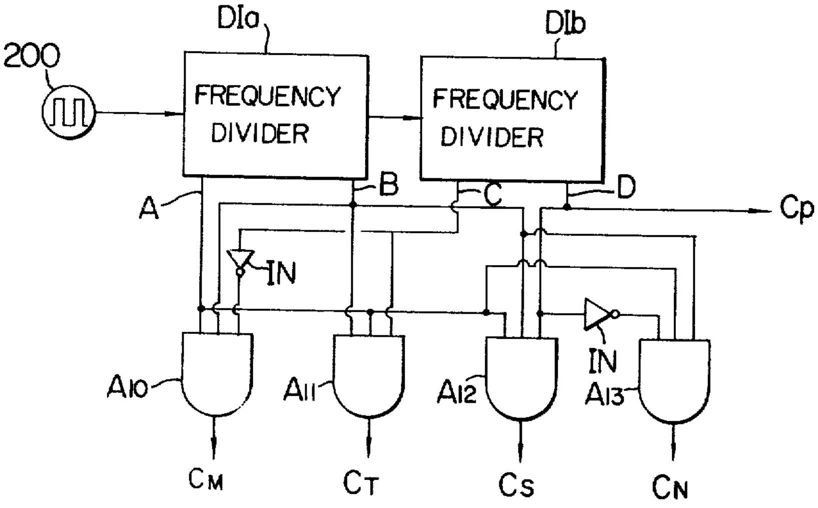
FIG. 9 shows a schematic configuration of a timing signal generating circuit 2 shown in FIG. 2.

Referring to FIG. 9, the timing of the arrival of those pulses and the manner of sending out the signals N and S are explained. FIG. 9 shows the detail of the timing signal generating circuit. Pulse output of a clock signal generator 200 is divided by frequency dividers $DI_a$ and $DI_b$. A10 to A13 denote AND circuits and IN denotes an inverter circuit. An output of the AND circuit A12 is taken as CS and an output of the AND circuit A13 is taken as CN. CS and CN can be logically expressed by $CS = A \cdot B \cdot D$ and $CN = A \cdot B \cdot \overline{D}$ where A, B, C and D are frequency divided outputs of the frequency dividers $DI_a$ and $DI_b$. The pulse outputs CS and CN are produced alternately at a constant time interval $T_1$. Thus, the pulses CS and CN each appear at a time interval $2T_1$.

Figure 10C:
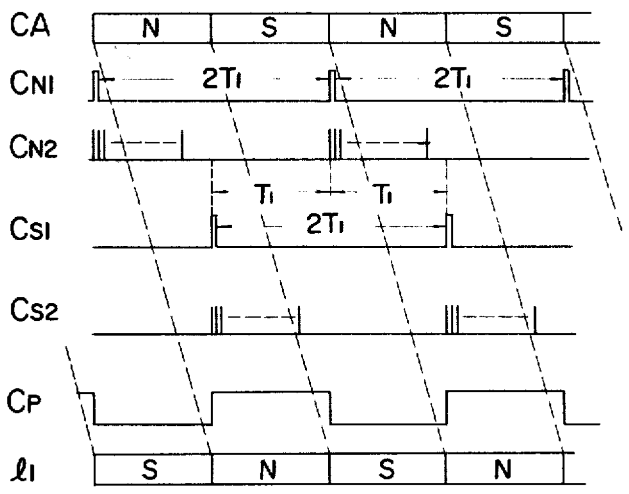

FIG. 10C shows a timing relation therebetween. The pulses CN and CS are pulse outputs having the period $2T_1$ such as CN1 and CS1. Pulses CN2 and CS2 are derived by modifying the pulses CN and CS and they produce a predetermined number of pulse outputs (equal to the number of bits of the registers RN and RS, respectively) after the pulses CN1 and CS1 have been produced. Pulse CP in FIG. 9 is taken from the output D of the frequency divider and it is applied to the AND circuits A1 and A2 (FIG. 2).

Thus, when the signal N is to be registered in the register 1, the timing signal generator 6 applies the signal CP to the AND circuit A1 through the inverter circuit IN to open it. The pulse CN1 sets the data in the register RN and the pulse CN2 sends the data to the output register 1 through the AND circuit A1 and the OR circuit O1. During this period, the AND circuit A2 is kept closed by the signal CP. When it is desired to register the signal S in the register 1 after the elapse of the time $T_1$, the AND circuit A1 is closed and the AND circuit A2 is opened, so that the data is set by the pulse CS1 and sent to the register 1 by the pulse CS2 through the AND circuit A2 and OR circuit O1.

The data stored in the register 1 is sent out to the data way $l_1$ when information to be stored in the register 1 next time is sent out of the OR circuit O1. Namely, when the transfer pulse CN2 is applied as shown in FIG. 10C, the signal N is received at the input of the register 1 in a manner shown in column CA and the signal S produced $T_1$ time period before is taken out of the register 1 as shown in column $l_1$.

In summary, the command word is transmitted in accordance with the following convention:

(1) The command word consists of the control signal N and the test signal S.

(2) The command word is transmitted for each period $T_1$ with the signals N and S being transmitted alternately.

(3) When the control rod is moved, the address signal part of the signal N transmitted for each period $T_1$ is maintained at a fixed code until the control rod reaches a predetermined position.

(4) During the test, the signal S applied to the valve under test is produced two times for the period $2T_1$.

(5) The codes of the operation parts of the signals N and S are "10101" and "01010", for example and the codes are produced alternately when the signal N or S is produced continuously.

The command word produced in accordance with the above rule is applied to transponders $T_1, T_2, T_3, \ldots T_n$ through the data way $l_1$. Each of the transponders transmits the received command word to the transponder T in the succeeding stage and to actuation circuits $M_1, M_2, M_3, \ldots M_n$. The actuation circuits M are provided one for each of the solenoid valves $V_1, V_2, V_3, \ldots V_n$. The actuation circuits M control the energization of the solenoid valves in accordance with the command word and also detect the operation status of the valves and convert the detected status into the acknowledge word and transmit it. When the transponder T receives the acknowledge word, it transmits the acknowledge word to the transponder in the preceding stage. In this manner, the acknowledge signal is finally transmitted to the central control room.

Although the command word is applied to all of the actuation circuits, only the actuation circuit having the address corresponding to the address of the command word responds to energize the valve.

Figure 3:
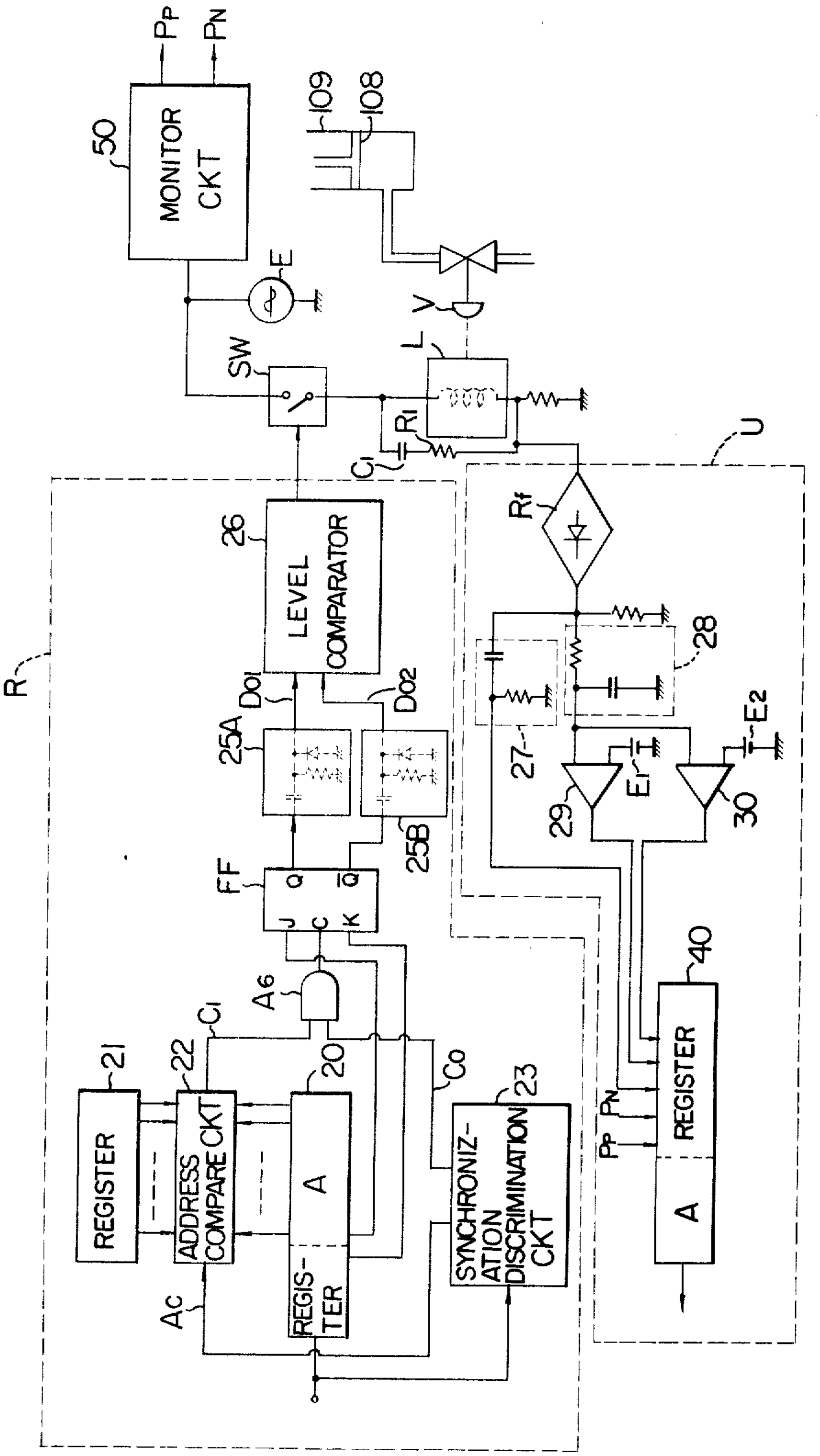
FIG. 3 shows a detailed circuit configuration of an actuation circuit located in a installation room.

FIG. 3 shows detail of the actuation circuit M, which comprises a receiver R to receive the command word for energizing an exciting coil L of the valve V and a transmitter U to send the response of the valve V to the control room in the form of the acknowledge word. The receiver R is first explained. L denotes the coil of the solenoid valve, SW denotes a switching element for controlling the energization of the coil L and E denotes a power supply for energizing the coil L.

Numerals 20 and 21 denote registers. The register 21 stores the address code which has been previously assigned to the actuation circuit M and hence to the valve V. The register 20 receives the command word through the transponder T. The command word comprises the synchronizing signal part Y, the address signal part A and the operation signal part OP as described above, and the register 20 stores the parts A and OP. The synchronizing signal part Y is applied to a synchronization discrimination circuit 23, which supplies an address compare command AC to an address compare circuit 22 a given time period T3 after the reception of the synchronizing signal. The given time period $T_3$ is defined by a time period required for the command word to be stored in the register. In response to the output of the synchronization discrimination circuit 23, the compare circuit 22 compares the content of the register 20 with that of the register 21. When they coincide, it produces a "1" output.

The synchronization discrimination circuit 23 supplies a synchronization discrimination signal CO to an AND circuit A6 slightly later from the time when it supplied the output to the compare circuit 22. Accordingly, if the addresses coincide, the output of the AND circuit assumes "1". FF denotes a J-K flip-flop. The output of the AND circuit A6 is applied to a clock terminal C of the flip-flop FF. As is well known, the flip-flop FF operates in accordance with the signals applied to the terminals J and K only when "1" is applied to the terminal C but does not operate irrespective of the change of the input signals applied to the terminals J and K when the clock at the terminal C is "0". That is, although the command word is applied to all of the actuation circuits M, only flip-flop FF which has the address corresponding to that of the command word is operated.

Figure 4:
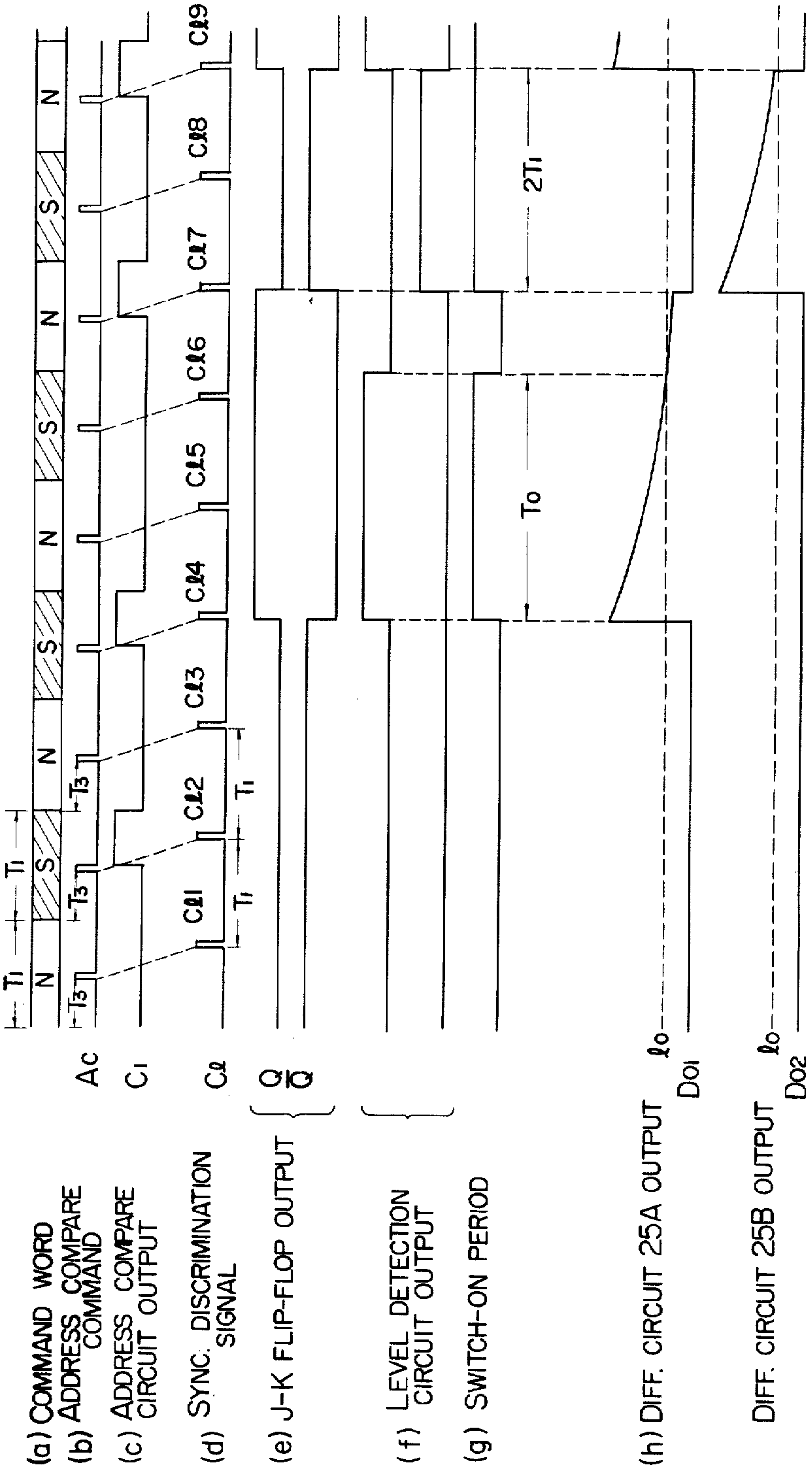
FIG. 4 shows signal waveforms at various points in a receiver R shown in FIG. 3.

The coding of the operation signal field of the command word complies with the rule described above. That is, when one of the two signals applied to the terminals J and K is "1", the other is always "0". Further, if the same address signal N or S is transmitted sequentially, it is switched between "10" and "01". The time interval required for the same address signal to arrive again is equal to $2T_1$. Accordingly, each time the same address signal arrives at the interval $2T_1$, the flip-flop FF is inverted. Numeral 25 denotes a differentiation circuit which produces a positive level differentiated output only when the output at the terminal Q or $\overline{Q}$ of the flip-flop FF is "1". Numeral 26 denotes a level comparator which produces a signal to close the switch Sw when the differentiated output of the differentiation circuit 25 exceeds a predetermined positive level $l_o$ (FIG. 4). The time period $T_o$ required for the differentiated output to decay to the level $l_o$ is set to be somewhat longer than $2T_1$. Accordingly, if the same address does not arrive again within the time period $T_o$ ($T_o > 2T_1$), the switch SW closes only for the time period $T_o$. If the same address arrives again within the time period $T_o$, the switch SW remains closed.

FIG. 4 shows signals waveforms at various points in the receiver. The operation of the receiver is now explained with reference to FIG. 4. The command word (a) comprises the alternate signals N and S. Assume that the hatched signals have coincident addresses. The synchronization discrimination circuit 23 produces the address compare signal the $T_3$ time after the reception of the synchronizing signal irrespective of the coincidence or anti-coincidence of the addresses and later produces the synchronization discrimination signal Cl. On the other hand, the address compare circuit 22 produces the output $C_1$ as shown in the column (c), and the clock output is applied to the flip-flop FF only when the signals (c) and (d) are both "1". Accordingly, as seen from FIG. 4, the clock output is applied to the flip-flop FF only during the synchronization discrimination signals $Cl_2$, $Cl_4$, $Cl_7$ and $Cl_9$, and the flip-flop FF is conditioned for reversal. However, there is a possibility that the same signals as those stored in the outputs Q and $\overline{Q}$ of the flip-flop FF are applied to the terminals J and K, when the clock output is applied to the flip-flop FF, and in that case the flip-flop FF is not reversed even if the clock output is applied thereto. Taking the timing of $Cl_2$ as an example, the flip-flop FF is not reversed because the inputs of $J=0$ and $K=1$ are applied when $Q=0$ and $\overline{Q}=1$. However, as for the clock signal $Cl_4$ which occurs $2T_1$ time later, the outputs Q and $\overline{Q}$ are reversed because $J=1$ and $K=0$. Thus, non-reversal condition may occur during the first cycle when the same address signal arrives at the interval $2T_1$ but the flip-flop responds properly in and after the second cycle. The reason for transmitting two or more test signals at the interval $2T_1$ is that there exists a possibility that the flip-flop FF may not be reversed by the first test signal. At the time of $Cl_2$, if $Q=0$, $\overline{Q}=1$ and $J=0$, $K=1$ and the flip-flop FF does not reverse, the outputs will be $Q=1$ and $\overline{Q}=0$ before the clock $Cl_7$ arrives. When the clock $Cl_7$ arrives, it is not certain whether the state will occur that $J=1$, $K=0$ or that $J=0$, $K=1$. In the illustrated example, the inputs are $J=0$ and $K=1$ and the flip-flop FF is reversed.

The differentiation circuit 25 comprises, for example, a capacitor, a resistor and a diode, and it produces a positive differentiated output when the input thereto rises to "1" and produces no differentiated output (e.g. produces zero level output) when the input thereto falls to "0". In case of the circuit 25A, since it receives the Q output of the flip-flop FF as an input thereto, it produces a differentiated output only when the output Q rises to "1". For example, at the time when the synchronization discrimination signal $Cl_4$ is applied, the output of the circuit 25A exceeds the level $l_o$ for the time interval $T_o$. Therefore, the level detection circuit 26 closes the switch Sw for the time interval $T_o$ to energize the coil L.

The time interval $T_o$ is set to be somewhat longer than the time interval $2T_1$. Therefore, if the command word of the same address arrives again within the time interval $T_o$, the flip-flop FF produces "1" output at the $\overline{Q}$ output and the circuit 25B would produce the differentiated output. In the illustrated example, however, the command word at that moment is the test signal S and the signal of the same address does not arrive within the time interval $T_o$. Therefore, the coil L is energized only during the time interval $T_o$.

On the other hand, after the synchronization discrimination signal $Cl_7$ has been applied, the control signal N is applied sequentially at the interval of $2T_1$. In this case, the command words which appear at the interval of $2T_1$ have the same address and the operation signal switches between "1" and "0" each time the command word arrives. Accordingly, the flip-flop FF reverses at the interval of $2T_1$. The circuits 25A and 25B alternately produce positive level differentiated outputs each time the flip-flop FF is reversed. Because of the relation $T_o > 2T_1$, the output of one of the differentiation circuits exceeds the level $l_o$ while the other is still producing the output of higher than the level $l_o$. Accordingly, so long as the signals of the same address arrive within the time interval $2T_1$, the coil L is energized continuously.

In this manner, the coil is energized in accordance with the command word. When the test signal S is applied, the coil L is energized at most for $2T_1 \times n$, where n is the number of the signals S which are applied sequentially, and it is normally 2 or 3. The time $T_1$ is approximately 100 μs. Therefore, the coil L is energized for 600 μs at most, and there is no possibility that the valve is operated by the energization of the coil. The solenoid operated device such as the solenoid coil usually has a long time constant in the order of 10 ms. In addition, it takes over ten seconds to apply water to the cylinder in response to the operation of the valve and drive the control rod to a predetermined position. Accordingly, the malfunction of the valve does not occur for at the most several test signals. By way of example, if it takes ten seconds to drive the control rod to the predetermined position, the control signals N of the same address must be applied approximately 50,000 times continuously.

The operation of the transmitter U is now explained. The present invention is characterized by verifying the test and the operation status of the valve by the current flowing in the coil. The construction of the transmitter U is first explained in brief. A series circuit of a capacitor $C_1$ and a resistor $R_1$ is connected across the coil L. A current flowing therethrough is rectified by a rectifier Rf and supplied to a differentiation circuit 27 and a filter circuit 28. Numerals 29 and 30 denote compare circuits which compare the output of the filter circuit 28 with reference voltages $E_1$ and $E_2$, respectively. Numeral 40 denotes an output register in which the acknowledge word is assembled. The output of the differentiation circuit 27 and the outputs of the compare circuits 29 and 30 are applied to the identification signal part of the acknowledge word.

Figure 5A:
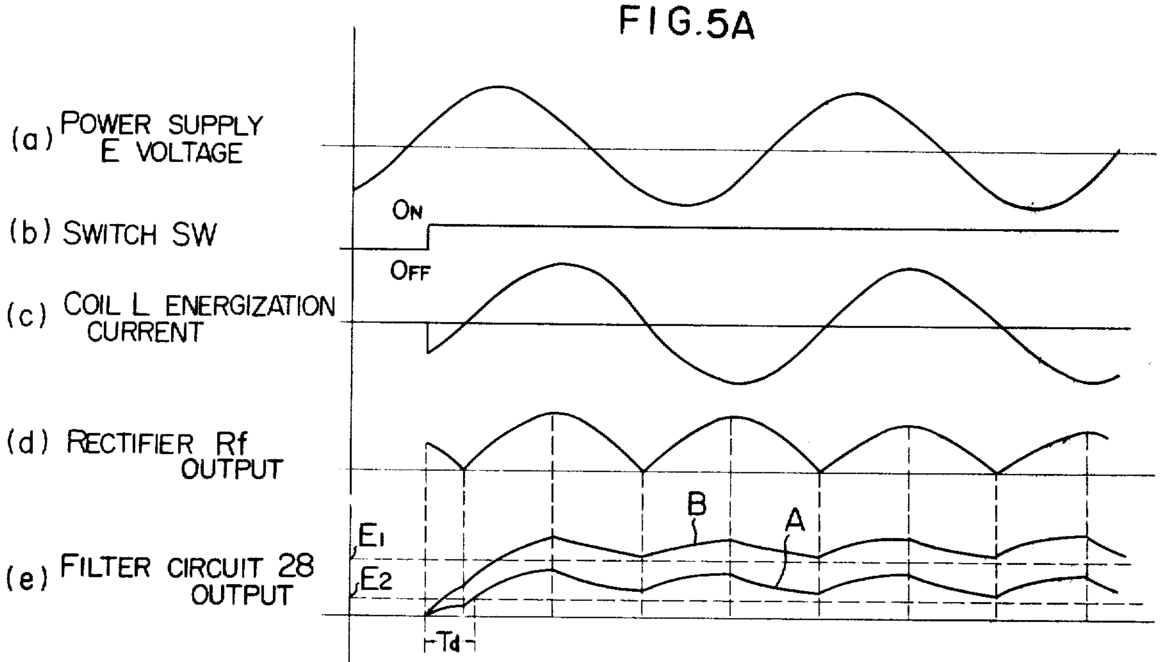
FIGS. 5A and 5B show signal waveforms at various points in a transmitter U shown in FIG. 3, when control signal and test signal are applied.
Figure 5B:
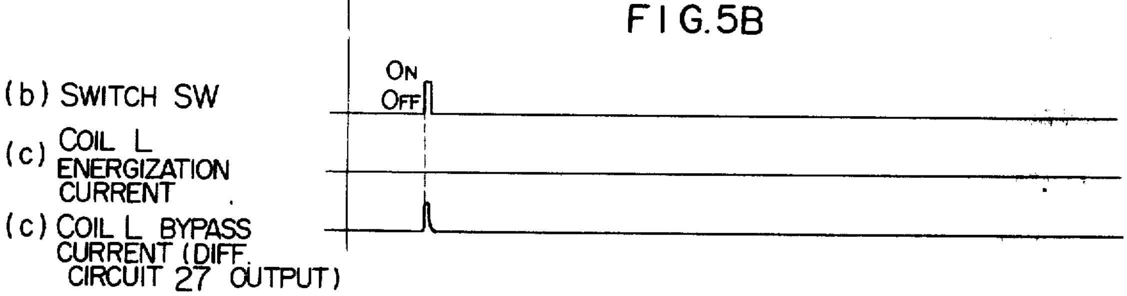

The operation of the transmitter U is explained with reference to FIGS. 5A and 5B. FIG. 5A shows output states of various points for the control signal N. After the switch has been turned on from off as shown in column (b), a current (c) which is lagging with respect to a power supply voltage (a) flows in the coil L. As shown in (d), the output of the rectifier Rf corresponds to a full-wave rectified version of the current (c). Except for the period immediately after the switch SW has been turned on from off, the output of the filter circuit 28 increases during the increase period of the output of the rectifier Rf and decreases during the decrease period of the output of the rectifier Rf to produce a substantially constant output. Two filter outputs are provided for the following reason.

When the switch SW is closed and the coil is energized, the impedance of the coil when the valve is stuck differs from that when the valve operates correctly, and hence the currents flowing therethrough are different. For example, when the valve operates correctly, the current as shown by A flows and when the valve is stuck the current B which differs from the current A flows. Further, if the power is off or the coil is broken, the current is zero. The current B which flows during sticking of the valve is not always larger than the normal current A but it changes depending on whether the valve is normally open type or normally close type.

According to the present invention, whether the valve has operated properly or not is determined by the change of the excitation current in the abnormal state and the normal state. The reference voltages $E_1$ and $E_2$ of the compare circuits 29 and 30 are used to discriminate whether the output of the filter circuit 28 is A or B, or zero. The discrimination result is assembled as the acknowledge word and sent to the control room. The control room determines the abnormal state of the valve depending on the particular combination of the outputs of the compare circuits 29 and 30. Since the output of the filter circuit does not reach the levels $E_1$ and $E_2$ for the period Td immediately after the switch SW has been closed, the control room does not perform the determination of abnormal during this period, as will be described later.

By way of example, if the compare circuits 29 and 30 produce "1" outputs when the inputs thereto exceed the levels $E_1$ and $E_2$, respectively, the following conditions may exist depending on the outputs of the compare circuits 29 and 30.

(I) The outputs of the compare circuits 29 and 30 are both "0":

No current flows through the coil, and it is considered that the contact of a connector is not properly made, a fuse is broken, the excitation coil is broken or a terminal does not operate.

(II) Output of the compare circuit 29 is "1" and output of the compare circuit 30 is "0":

The current is within the upper and lower limits and the system is normal.

(III) The outputs of the compare circuits 29 and 30 are both "1":

The current is above the upper level, and it is considered that the valve is stuck.

(IV) Output of the compare circuit 29 is "0" and the output of the compare circuit 30 is "1":

The compare circuit 29 or 30 does not operate properly.

The test operation is now explained. The bypass circuit of the coil L is provided to detect the test current. As shown in FIG. 5b, the closure time of the switch SW is in the order of several hundred μs and no current flows in the coil L under such a short time energization. In the test period, the current flows into the differentiation circuit 27 from the switch SW through $C_1$, $R_1$ and Rf. This current is pulse current. If this pulse current is produced by the differentiation circuit during the test period, it is determined that the system is normal. During the test time, since only the pulse current flows, the output of the filter circuit 28 which functions as an integrator is substantially zero.

Figure 6:
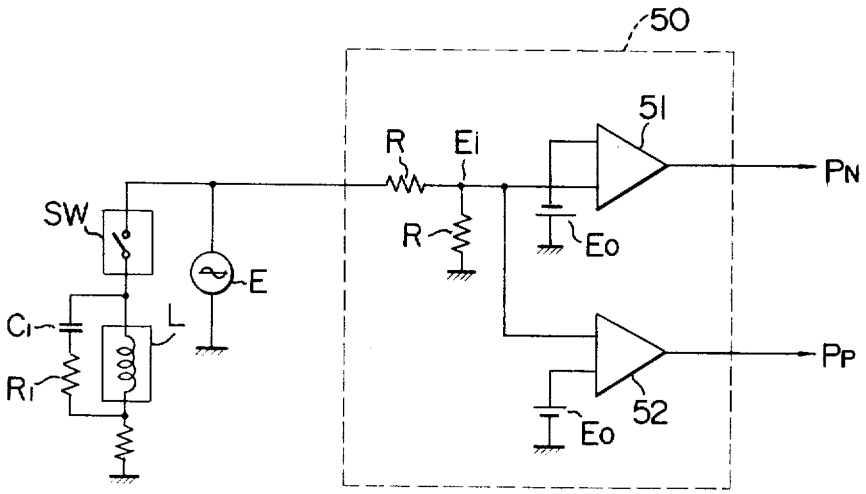
FIG. 6 shows a specific circuit configuration of a power supply voltage monitor circuit 50 shown in FIG. 3.

Although the switch SW is closed for only 200 μs to supply the current during the test period, the test current is small if the absolute value of the power supply voltage, which is an A.C. voltage, is small. Accordingly, when the absolute value of the A.C. voltage is small, the test current of the acknowledge word which is sent to the register 40 has low reliability. For this reason, in the present invention, the power supply voltage is monitored by a voltage monitor circuit 50 and the information therefrom is edited in the acknowledge word, which is then transmitted to the control room. FIG. 6 shows an embodiment of the voltage monitor circuit. In FIG. 6, R denotes a resistor, 51 and 52 denote comparators and $\pm E_o$ denote reference voltages. The comparator 51 produces "1" output when an input voltage $E_i$ is smaller than the negative reference voltage $-E_o$. This output is designated $P_N$. Comparator 52 produces "1" output when the input voltage $E_i$ thereto is larger than the positive reference voltage $+E_o$. This output is designated $P_P$. In essence, when $E_i > E_o$ or $E_i > -E_o$, either $P_N$ or $P_P$ is "1". When either $P_N$ or $P_P$ is "1", the test current information is reliable, and when both $P_N$ and $P_P$ are "0", the test current information is not reliable. The outputs $P_N$ and $P_P$ are edited into the acknowledge word in the register 40 and sent to the control room.

In this manner, according to the present invention, the test and operation verifying signals are derived from the current. The bypass circuit of the coil is necessary only during the test period but not necessary during the continuous energization. Since it is sufficient that the bypass circuit can pass the pulse current during the test period, the constants of the $C_1$ and $R_1$ can be selected to pass only the high frequency component and exhibit a high impedance to the low frequency component. In this manner, the bypass circuit does not affect adversely during the continuous energization.

The acknowledge word thus assembled and transmitted is received by the control room and stored in a reception register 3.

Figure 7:
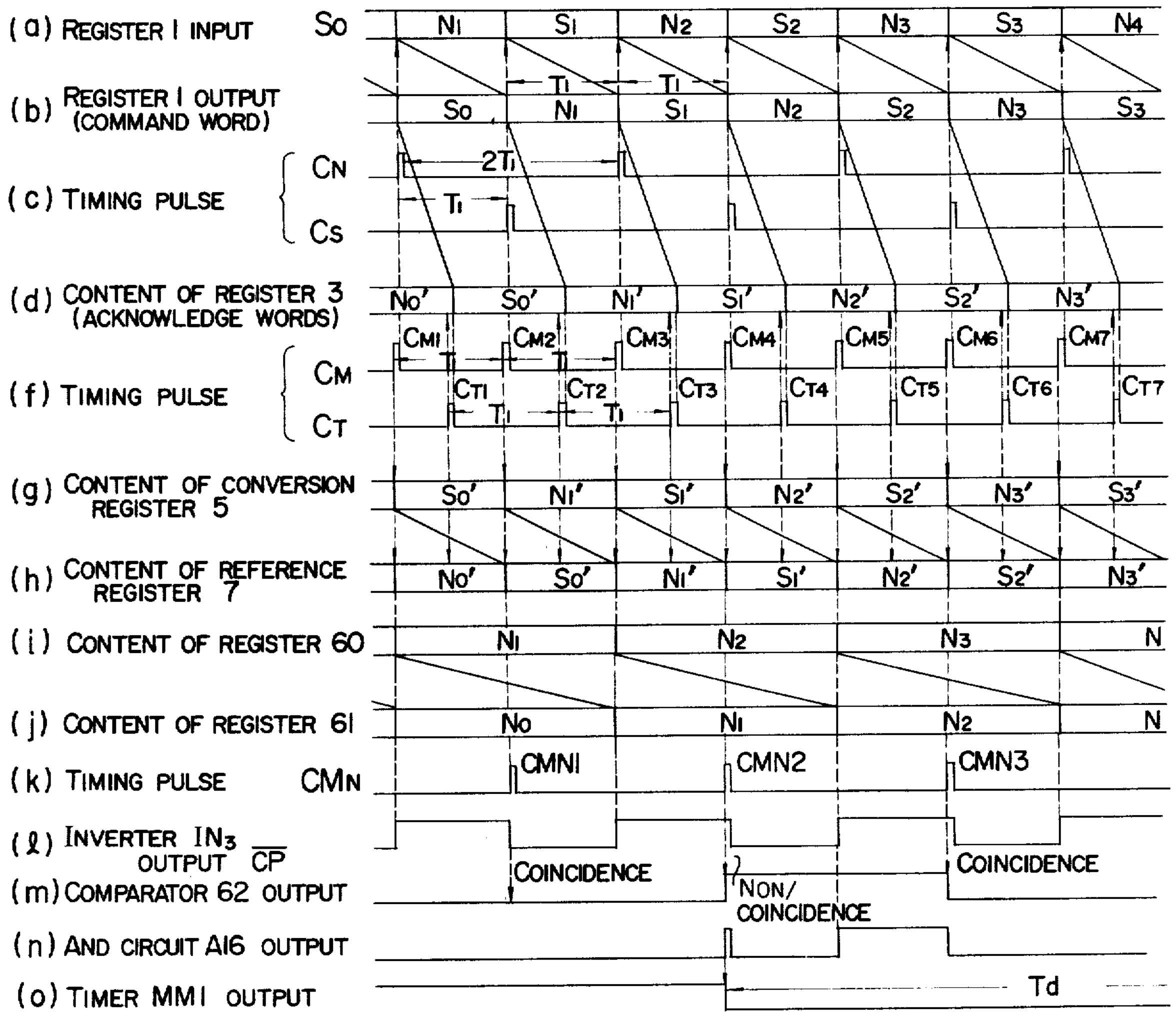
FIG. 7 shows waveforms in the operation of the operation monitor system of the present invention for illustrating that the reference word is assembled from the command word and compared with the acknowledge word sent back and the indication is inhibited during a predetermined period after the address of the signal N has been altered.

As partly explained in conjunction with FIG. 10C, the command word is sent out of the output register 1 in FIG. 2 when the information to be sent next time arrives at the input of the register 1. Namely, as shown in FIG. 7, when the signal N is applied to the register 1, the signal S is pushed out to the data way $l_1$, and when the signal S enters the register 1, the signal N is pushed out to the data way $l_1$. In FIG. 7, (a) represents the input information to the register 1, (b) represents the command word sent out of the register 1, and (c) represents the timing pulses $C_N$ and $C_S$. Thus, it follows that the timing pulse $C_S$ states the send out of the signal N to the data way $l_1$ and the timing pulse $C_N$ starts the send out of the signal S to the data way $l_1$.

The send out of the command word occurs at the interval of $T_1$. On the other hand, the acknowledge word is received $T_1/2$ time interval after the send out of the command word. The acknowledge word is shown in FIG. 7(d).

In the present system, the reference word is assembled based on the command word, and the reference word is compared with the acknowledge word to monitor the operation of the apparatus in the installation room based on the non-coincidence therebetween. This monitor operation is now explained below.

In FIG. 2, numeral 5 denotes a conversion register, 7 denotes a reference register and 8 denotes a compare circuit. The conversion register 5 assembles the reference word from the command word. It converts only the operation signal part without changing the address part. The conversion register, in essence, predicts the acknowledge word which would be sent back when the actuation circuit M receives the command word and operates properly in response thereto. Accordingly, if the reference word coincides with the acknowledge word, it can be determined that there exists abnormal condition in the actuation circuit. The reference register 7 stores the reference word assembled in the conversion register 5. The comparator 8 compares the reference word with the acknowledge word and produce "1" output when there exists non-coincidence therebetween.

The pulse signal $C_M$ applied to the output register 1, the conversion register 5 and the reference register 7 indicates data transfer command. When this pulse is applied, the content of the output register 1 is transferred to the register 5, the content of the register 5 is transferred to the register 7, and the content of the register 7 is transferred out. The transfer out means that the stored content is erased. The pulse signal $C_M$ which is applied to the registers 1, 5 and 7 is, in actual fact, applied to the register 7 first to transfer out the content thereof and is then applied to the register 5 to transfer the content thereof to the register 7. Thereafter, the timing pulse is applied to the register 1 to transfer the content thereof to the register 5.

The pulse $C_T$ applied to the compare circuit 8 is a compare command pulse. The pulses $C_M$ and $C_T$ are generated by the timing pulse generator 6 (FIG. 9). The pulses $C_M$ and $C_T$ are fed from the outputs of the AND circuits $A_{10}$ and $A_{11}$. The pulses $C_M$ and $C_T$ can be logically expressed by $C_M = A \cdot B \cdot \overline{C}$ and $C_T = A \cdot B \cdot C$, where A, B and C are outputs of the frequency divider. The pulses, $C_M$ and $C_T$ are produced alternately at a given time interval, that is, $T_1/2$. Thus, the pulses $C_M$ and $C_T$ each appears at the time interval of $T_1$, as shown in FIGS. 7(d) and (f). The pulse $C_M$ appears immediately before the timing pulses $C_N$ and $C_S$ for sending out the command word appears. The timing pulse $C_T$ appears immediately before the acknowledge word is received.

The timing pulses are produced in the timing described above. Thus, during the time that a transfer command pulse $CM_4$, for example, is produced, the output register 1 has been storing the signal $N_2$. Thus, the conversion register 5 stores a signal $N_2'$ at the time $CM_4$. The signal $N_2'$ represents the reference word assembled by the conversion register 5. Similarly, by the pulse $CM_4$, the reference register 7 stores a signal $S_1'$ which has been stored in the register 5. The signals stored in the registers 5 and 7 are maintained until the next transfer command pulse $C_{M5}$ arrives. When the content of the register 1 is transferred to the register 5 by the pulse $C_M$, the content of the register 1 is maintained. In this manner, the command word is sequentially stored with delay. As a result, the reference word in the register 7 is maintained during the next period to the send out period for the command word.

On the other hand, the acknowledge word is transmitted $T_1/2$ time interval later than the command word. The compare command $C_T$ is produced immediately before the acknowledge word is received. When the pulse $C_{T4}$, for example, is produced, the reception register 3 has been storing the signal $S_1'$, and the reference register 7 has been storing the reference word for the signal $S_1'$. Accordingly, the actuation circuit can be monitored by comparing the contents of both registers. The compare circuit 8 produces $E_1$ output if there exists non-coincidence of even one bit therebetween. The $E_1$ output is "1" when non-coincidence exists and it is displayed by an display EL through AND circuits $A_{18}$ and $A_{19}$, an OR circuit 04 and a memory Me.

In this manner, the actuation circuit is monitored. The abnormal result from the compare output $E_1$ is indicated only when the AND circuit $A_{18}$ or $A_{19}$ is satisfied. As described above, when the valve control signal N is applied, the information of the acknowledge word within a given time period after the address has been changed may not be reliable. Further, when the test signal S is applied, the acknowledge word for the first cycle command word should not be compared. Inhibit function of the indication for those cases are performed by an indication inhibit circuit 90, which comprises signal change comparators $V_1$ and $V_2$ and an inhibitor $V_3$.

The comparators $V_1$ and $V_2$ receive the signals N and S, respectively and detect the non-coincidence of the addresses. The comparator $V_1$ is explained first. It is assumed that the address after the signal $N_2$ does not coincide with that of the signal $N_1$.

In the comparator $V_1$, the valve control signal N is applied to a register 60 from the signal generating circuit 4. The content of the register 60 is updated each time the signal N appears in order to transfer it to the register 1, and the content stored in the register 60 is transferred to the register 61. Thus, the same content is stored in the registers 60 and 61 for the time period $2T_1$. The contents of the registers 60 and 61 are shown in FIGS. 7(i) and 7(j).

Numeral 62 denotes a compare circuit. A compare command $C_{M1}$ is derived by frequency dividing the timing pulse $C_M$. The pulse generating circuit 6 alternatively produces a pulse $C_{MN}$ for the comparator $V_1$ and a pulse $C_{MS}$ for the comparator $V_2$. The compare circuit 62 compares only the addresses and produces "0" output when the addresses coincide and "1" output when they do not coincide. In the illustrated example, since the address changes after the signal $N_2$, the non-coincidence of the addresses occurs at the comparison. At the appearance of the timing pulse $C_{MN2}$ and the compare circuit 62 produces "1" output. When the timing pulse $C_{MN3}$ is produced, the addresses coincide and the compare circuit 62 produces "0" output. An output of an inverter circuit $IN_3$ (which is an inverted output $\overline{CP}$ of the output CP) changes as shown in (l). Thus, the output of the AND circuit A16 changes as shown in (n), and an output of a timer MM1 is "0" for a given time period after the rise of the output of the AND circuit A16. This time period corresponds to Td shown in FIG. 5.

Inputs to an AND circuit A19 are output of the comparator 8, output of the time MM1 and output of the inverter circuit $IN_3$. The timing relation of those three signals is as follows. Before time $t_o$ when the address change is detected, two inputs to the AND circuit A19 are "1" only when the signal N is compared (i.e. when the timing pulses $CT_1$, $CT_3$ and $CT_5$ are produced). Accordingly, when there occurs non-coincidence between the reference word and the acknowledge word for the signal N, it is immediately displayed through the OR circuit 04 and the memory Me. After the time $t_o$ when the address is changed, erroneous information is received for the time period Td as described in connection with FIGS. 5A and 5B, but since the output of the timer MM1 is "0", the non-coincidence output "1" at the comparator 8, even if it appears, is not displayed. This inhibit function of display is carried out for the signal $N_2$ at which the address has changed.

Figure 8:
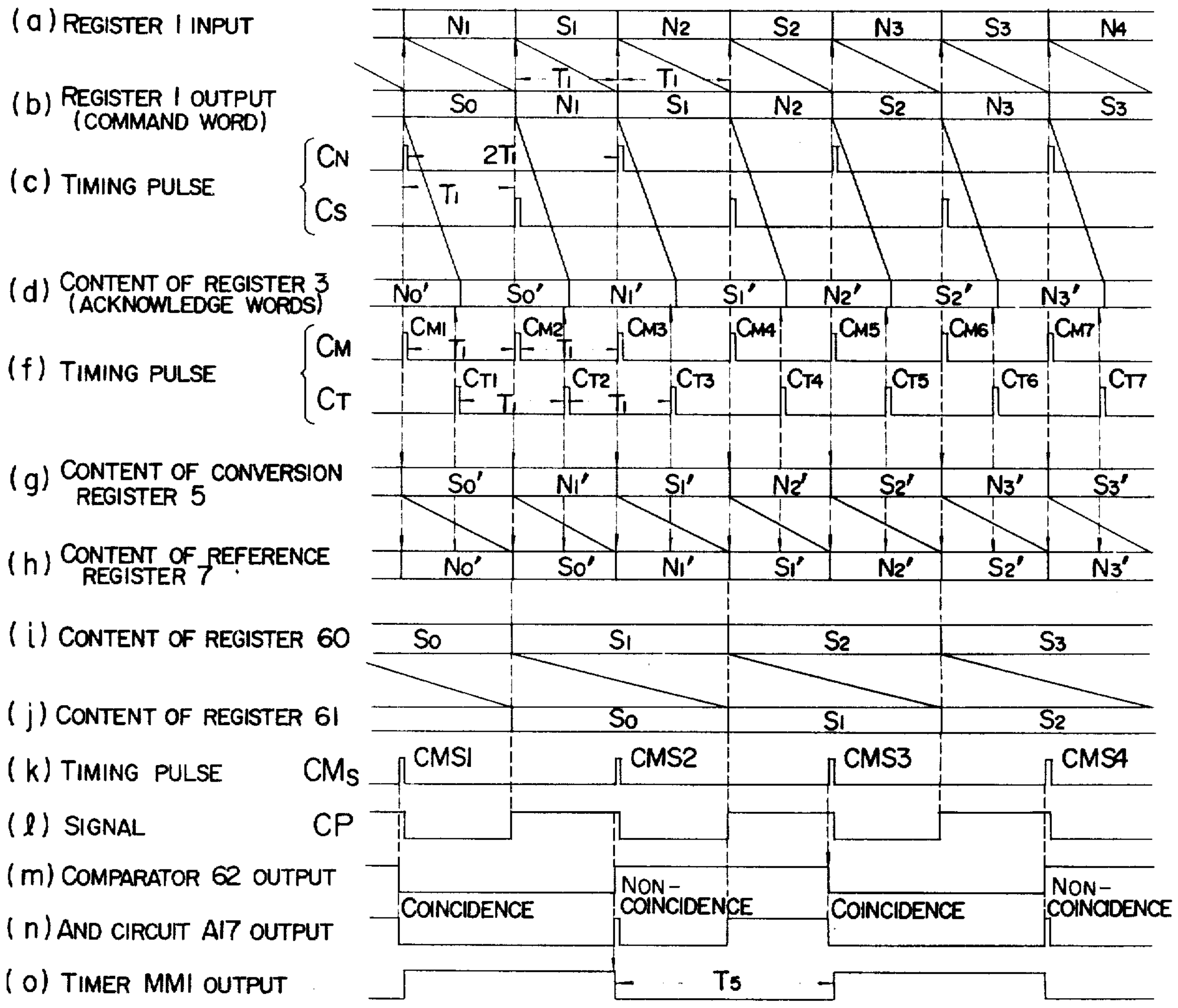
FIG. 8 shows waveforms in the operation of the operation monitor system of the present invention for illustrating the prevention of erroneous indication by the test signal S having an altered address.

FIG. 8 illustrates the display inhibit function for the signal S. In FIG. 8, since (a) to (j) are similar to those in FIG. 7, they are not explained here. The signals shown in (i) and (j) in FIG. 8, however, are shown for the signal S and they differ from those of FIG. 7 in that they are preserved for the time period $2T_1$ from the rise of the timing pulse $C_S$. The timing pulse $C_{M3}$ shown in (j) corresponds to the timing pulses $C_{M1}$, $C_{M3}$, $C_{M5}$ and $C_{M7}$ of the timing pulses $C_M$. For the signal S, the signal having the same address is applied twice and the display for the first cycle signal (that is, the signal at which the address has been changed) is inhibited.

In the illustrated example, the signals $S_1$ and $S_2$ have the same address. Therefore, the compare signal to compare the acknowledge words for the signals $S_1$ and $S_3$ must be inhibited.

Since the addresses are changed every other time, if the contents of the registers 60 and 61 are compared at the timing pulse $C_{MS}$, there occurs anti-coincidence at $C_{MS2}$ and at $C_{MS4}$ and the compare circuit 62 produces "1" output. At $C_{MS1}$ and $C_{MS3}$, they are coincident and the compare circuit 62 produces "0" output. An output to an AND circuit $A_{17}$ which receives the pulse CP and the output of the compare circuit 62 changes in a manner shown in (n), and a timer $MM_2$ responds to the pulse output of the AND circuit $A_{17}$ to produce "0" output for the time interval $T_5$ from that moment.

Inputs to an AND circuit $A_{18}$ are the output of the comparator 8, the signal CP and the output of the timer $MM_2$. Thus, as seen from FIG. 8 (o), (l) and (f), the outputs (o) and (l) both become "1" when the comparison by $C_{T2}$ and the comparison by $C_{T6}$ are made. At the time of $C_{T2L}$, the signal $S_o$ is compared while at the time of $C_{T6}$ the signal $S_2$ is compared. This is the second cycle test signal. At the beginning of the address change, the compare result of the compare circuit 8 is inhibited by the AND circuit A18. Accordingly, the erroneous information due to the first cycle address signal is not displayed.

As described hereinabove, the present system discriminates reliable information and non-reliable information and allows display of only the reliable information.

Furthermore, the present system inhibits the evaluation of the test signal S when the absolute value of the power supply voltage for the solenoid valve is small. Numeral 80 denotes an inhibit circuit therefor. The circuit 80 receives the data $P_P$ and $P_N$ relating to the supply voltage information in the acknowledge word and detects when one of the inputs is "1", that is, when the power supply voltage $E_i$ satisfies the relation $E_i > E_o$ or $E_i > -E_o$, by means of the OR circuit OR7. At this time, the display is not inhibited. The output of the OR circuit OR7 is applied to the AND circuit A19. Accordingly, display is allowed only when the output of the OR circuit OR7 is "1" and display is inhibited when the output is "0". In this manner, an accurate test for the actuation circuit M is assured even with an A.C. power supply.

We claim:

1. A monitor system for monitoring the operation of solenoid operated devices comprising:

a transmitter at a control site for assembling a command word having at least an address signal and an operation signal and for transferring said command word to a data path at intervals of first time $T_1$;

a plurality of solenoid operated devices each having a coil connected across an ac power source through switching means, said solenoid operated devices each being switched between open state and closed state by closing and switching means when said coils are energized;

a plurality of receivers at a remote site corresponding to respective solenoid operated devices, said receivers generating a signal for closing the corresponding switching means during second time $T_2 (T_2 \geqq T_1)$ when the address signal of the command word from said data path coincides with that of said corresponding solenoid operated device;

a transmitter at said remote site for assembling an acknowledge word including the address signal of said corresponding solenoid operated device operated in accordance with said command word, and an operation status signal indicating the operation status of said corresponding coil, and for transmitting said acknowledge word to said control site;

a monitor circuit at said control site for predicting from said command word said acknowledge word which is to be sent back to said control site when said corresponding solenoid operated device operates properly in response to said command word, for assembling reference words on the basis of said command words, and for comparing said reference word with said acknowledge word to monitor the operation of said solenoid operated devices wherein said transmitter at said remote site comprises a series circuit of a capacitor and a resistor connected across said corresponding coil, a discrimination means responsive to the magnitude of a signal corresponding to an average value of the current flowing in said series circuit, a pulse detection means for detecting a pulse current flowing in said series circuit, and a transmission means for assembling said acknowledge word on the basis of signals from said discrimination means and said pulse detection means and for transferring said acknowledge word.

2. A monitor system according to claim 1, wherein one of said command words having the same address as the previous one of said command words is again sent within said second time $T_2$ in order to energize said corresponding coil to switch the state of said corresponding solenoid operated device, the comparison of said reference word with said acknowledge word being inhibited within a time period from a time at which the said command word is transmitted to a time at which the energization of said coil is accomplished.

3. A monitor system according to claim 1, further comprising a voltage monitor means for monitoring the absolute value of the voltage of said ac power supply for energizing said coil of said solenoid operated devices, a signal from said voltage monitor means being included in said acknowledge words as a state signal, so that when said command words are sent from said control site to said remote site in order to test said solenoid operated devices, the current flows in said coils during the time that the state of said solenoid operated devices is not switched, and when said absolute value is less than a predetermined value, the comparison of said acknowledge words and said reference words is inhibited.

4. A monitor system according to claim 1, wherein said series circuit exhibits a high impedance to the frequency of the ac power supply and a low impedance to the frequency of a signal for momentarily energizing the coils.

* * * * *